Dec. 8, 1942.        R. O. WISE        2,304,135
MODULATING SYSTEM
Filed May 13, 1941        2 Sheets-Sheet 1

INVENTOR
R.O. WISE
BY *H.A.Burgers*
ATTORNEY

Dec. 8, 1942.    R. O. WISE    2,304,135
MODULATING SYSTEM
Filed May 13, 1941    2 Sheets-Sheet 2

INVENTOR
R. O. WISE
BY H. A. Burgess
ATTORNEY

Patented Dec. 8, 1942

2,304,135

UNITED STATES PATENT OFFICE 2,304,135

MODULATING SYSTEM

Raymond O. Wise, Short Hills, N. J., assignor to Bell Telephone Laboratories, Incorporated, New York, N. Y., a corporation of New York Application May 13, 1941, Serial No. 393,167

4 Claims. (Cl. 179—171.5)

This invention relates to frequency changers which may be either modulators, demodulators, or detectors for use in signaling transmission systems, and more particularly to such frequency changers embodying both rectifiers and inductances.

Systems of the kind to which this invention relates comprise a plurality of sources of alternating current waves, a load circuit, and means interposed therebetween to generate and control waves of desired form and frequency for use in the load circuit. Such system is often referred to as a frequency changer due to the fact that the input and output circuits contain waves of different frequencies. High efficiency of energy transfer is attainable by providing a suitable coupling of variable nature between the wave sources and the load. Such coupling effectively regulates the frequency change and controls the amplitude of the output waves in accordance with variations of certain input waves. This invention contemplates a coupling to accomplish the frequency change with minimum loss of energy so as to promote high efficiency.

The main object of the invention is to provide frequency changing apparatus which performs a change in frequency with economy.

In a specific embodiment, the invention comprises a coupling bridge network embodying an inductance in each of two first adjacent arms and rectifying means in each of two other adjacent arms. Additional inductances coupled to the network inductances serve to connect effectively the bridge network to the sources of alternating current waves, or the load circuit.

Figure 1:
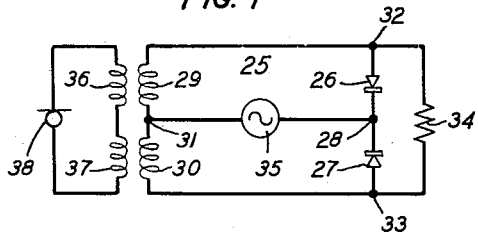

The invention will be more readily understood from the following description taken together with the accompanying drawings, in which:

Fig. 1 is a schematic circuit showing a coupling network arranged to operate as a frequency changer in accordance with one embodiment of the invention; and Figs. 2 through 16 are schematic circuits illustrating additional coupling networks arranged to operate as frequency changers in accordance with other embodiments of the invention.

In the following description, the same reference numerals are utilized to identify the same elements appearing in the several figures of the drawings.

Fig. 1 shows a modulating system in which a Wheatstone bridge network 25 embodies non-linear rectifiers 26 and 27 which have a common terminal 28 and are so poled that each is conductive toward this common terminal, as indicated by the arrowheads in the schematic representation, and split transformer windings 29 and 30 which have a common terminal 31, both terminals 28 and 31 constituting the horizontal diagonal of the bridge network. Rectifier 26 and winding 29 have a common terminal 32, and rectifier 27 and winding 30 have a common terminal 33, both terminals 32 and 33 constituting the vertal diagonal of the bridge network. Across the vertical terminals 32 and 33 is connected a load circuit 34. A carrier wave generator 35 is applied between the horizontal terminals 28 and 31. The pairs of terminals 28 and 31 and 32 and 33 are conjugately related, the carrier source and load circuit appearing in the respective conjugate branches. Split transformer windings 29 and 30 and 36 and 37 couple a signal source 38 to the bridge network 25.

The operation of the bridge network 25 of Fig. 1 is well known, and briefly comprises applying a signaling voltage across the vertical terminals 32 and 33 and, at the same time, impressing a carrier voltage across the horizontal terminals 28 and 31. These voltages together with the non-linear resistance characteristic of the rectifiers 26 and 27 produce a modulation action whereby both the carrier and signaling currents are combined in the well-known manner to effect a signal modulated carrier wave. This is most efficiently accomplished when the rectifiers and transformer windings comprising the arms of the bridge network are balanced to a relatively high degree of precision in both the conductive and non-conductive directions. The transformer windings 29 and 30 and 36 and 37 prevent effectively direct transmission from the signaling source 38 to the bridge network 25.

Figure 2:
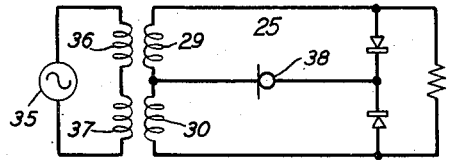

Fig. 2 is similar to Fig. 1 except the carrier generator 35 and signal source 38 are interchanged. The transformer windings 29 and 30 and 36 and 37 prevent effectively direct transmission between the carrier generator 35 and the bridge network 25.

Figure 3:
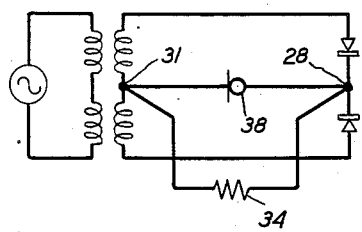

Fig. 3 is similar to Fig. 2 except the load circuit 34 is applied across the horizontal terminals 28 and 31 in shunt of the signal source 38.

Figure 4:
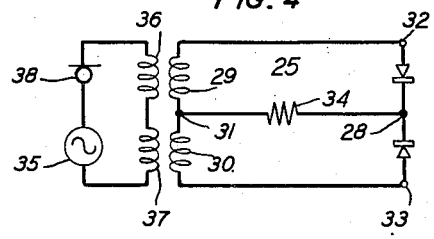

Fig. 4 is similar to Fig. 1 except the carrier generator 35 and signal source 38 in series are effectively coupled to the network 25 by the transformer windings 29 and 30 and 36 and 37, and the load circuit 34 is directly connected between the horizontal terminals 28 and 31. The transformer windings 29 and 30 and 36 and 37 prevent effectively direct transmission between both the carrier generator 35 and signaling source 38 and the network 25.

Figure 5:
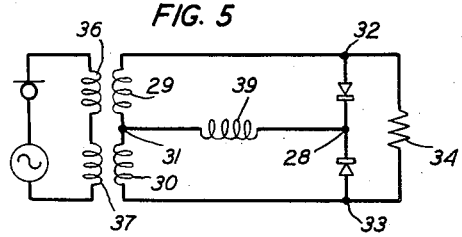

Fig. 5 is similar to Fig. 4 except an inductor 39 is disposed between the horizontal terminals 28 and 31, and the load circuit 34 is directly applied across the vertical terminals 32 and 33.

Figure 6:
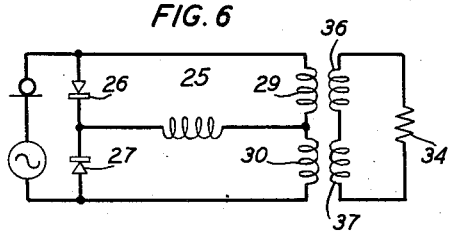

Fig. 6 is similar to Fig. 5 except the rectifiers 26 and 27 and the split transformer windings 29 and 30 are interchanged in the network 25, and the associated split transformer windings 36 and 37 couple the former windings to the load circuit 34. The transformer windings 29 and 30 and 36 and 37 prevent effectively direct transmission between the bridge network 25 and the load circuit 34.

Figure 7:
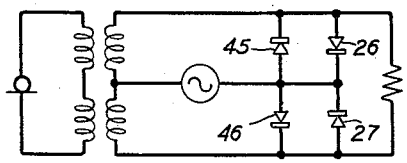

Fig. 7 is similar to Fig. 1 except rectifiers 45 and 46 shunt the respective rectifiers 26 and 27 and are poled in a direction individually opposite thereto. In Fig. 7 the conductive direction of one rectifier of each pair of rectifiers in parallel in each network arm is substantially coincident with the non-conductive direction of the other rectifier of the same pair. Thus, when the rectifier 26 is conductive, the rectifier 45 is non-conductive and vice versa; and when the rectifier 27 is conductive, the rectifier 46 is non-conductive, and vice versa.

Figure 8:
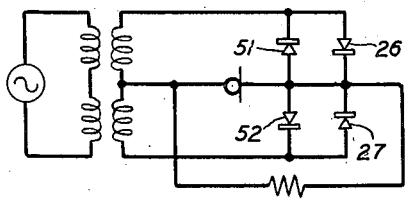

Fig. 8 is similar to Fig. 3 except rectifiers 51 and 52 shunt the respective rectifiers 26 and 27 and are poled in directions individually opposite thereto in a manner identical with the respectively corresponding rectifiers 45 and 46 of Fig. 7.

Figure 9:
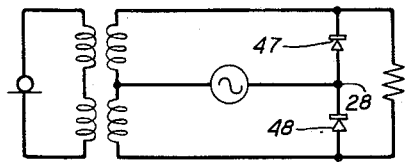

Fig. 9 is similar to Fig. 1 except the rectifiers 47 and 48 are poled in the same direction with respect to the common terminal 28. Hence, the rectifier 47 is poled in a direction away from the common terminal 28 and rectifier 48 is poled in a direction toward the common terminal 28.

Figure 10:
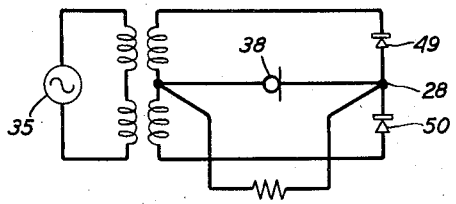

Fig. 10 is similar to Fig. 3 except the non-linear rectifiers 49 and 50 are poled in the same direction with respect to the common terminal 28. Thus, the rectifier 49 is poled in a direction away from the common terminal 28 and the rectifier 50 is poled in a direction toward the common terminal 28.

Figure 11:
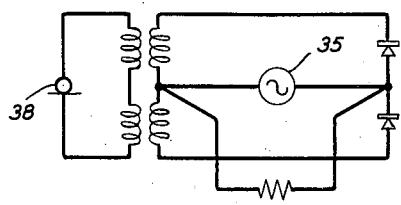

Fig. 11 is similar to Fig. 10 except the signaling source 38 and carrier generator 35 are interchanged.

Figure 12:
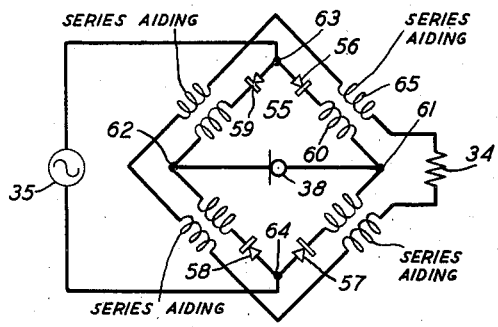

Fig. 12 shows a bridge network 55 embodying rectifiers 56, 57, 58 and 59 each of which includes in series an inductance 60. Rectifiers 56 and 57 are poled in a direction toward a common terminal 61; and rectifiers 58 and 59 are poled in a direction toward a common terminal 62. Across vertical terminals 63 and 64 is directly applied the carrier generator 35, while across the horizontal terminals 61 and 62 is directly connected the signal source 38. Coupled with the inductance 60 of each network arm is an inductance 65 such that the several inductances 65 are applied in series with the load 34. Thus, the associated inductances 60 and 65 of each network arm prevents effectively direct transmission between the network 55 and the load circuit 34. The inductances 65 are arranged in a series-aiding relationship. The network 55 is balanced to a relatively high degree of precision in both the conductive and non-conductive directions. Fig. 12 operates in the well-known manner to produce signal modulated carrier waves.

Figure 13:
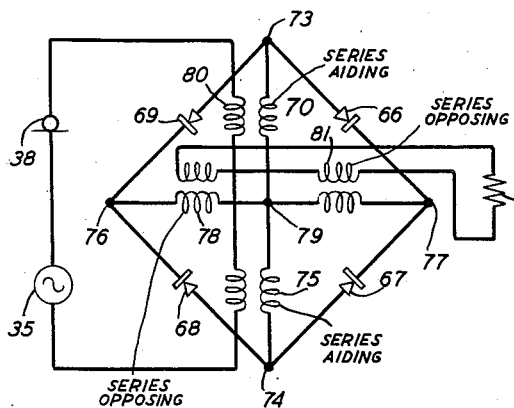

Fig. 13 illustrates a bridge network 70 embodying rectifiers 66, 67, 68 and 69. Rectifiers 66 and 67 are poled in a direction toward common terminal 77; and rectifiers 68 and 69 are poled in a direction toward common terminal 76. Across the vertical terminals 73 and 74 is a split transformer winding 75 whose component windings are arranged in a series-aiding relation; and across horizontal terminals 76 and 77 is a split transformer winding 78 whose component windings are arranged in a series-opposing relation, both split windings 75 and 78 having a common terminal 79 at their mid-points. A split transformer winding 80 couples the carrier generator 35 and signaling source 38 in series to the split winding 75 and thereby to the vertical diagonal of the network 70. A split transformer winding 81 couples the load circuit 34 to the split winding 78 and thereby to the horizontal diagonal of the network 70. The rectifiers of the network 70 and the split windings 75 and 78 connecting opposite diagonals thereof are balanced to a relatively high degree of precision in both conductive and non-conductive directions. The operation of the network 70 is well understood to produce signal modulated carrier waves. The transformer windings 75 and 80 and 78 and 81 prevent direct transmission between the network 70 and the respective signaling source 38 and carrier generator 35 and the load circuit 34.

Figure 14:
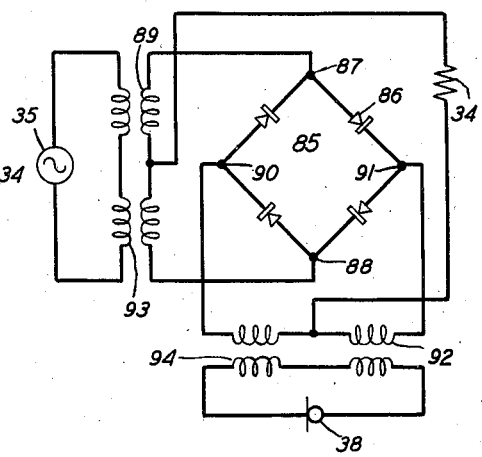

Fig. 14 shows a bridge network 85 embodying a plurality of rectifiers 86 poled in a clockwise direction. Across vertical terminals 87 and 88 is a split transformer winding 89, and across horizontal terminals 90 and 91 is a split transformer winding 92, both split transformer windings 89 and 92 and the network 85 being balanced to a relatively high degree of precision in both conductive and non-conductive directions. To the mid-points of the split windings 89 and 92 is applied the load circuit 34. A split transformer winding 93 couples the carrier generator 35 to the split transformer winding 89 and thereby to the horizontal diagonal of the network 85. A split transformer winding 94 couples the signal source 38 to the split transformer winding 92 and thereby to the horizontal diagonal of the network 85. Fig. 14 operates in the well-known manner to produce signal modulated carrier waves. The transformer windings 89 and 93 and 92 and 94 prevent effective direct transmission between the network 85 and the respective signaling source 38 and carrier generator 35.

Figure 15:
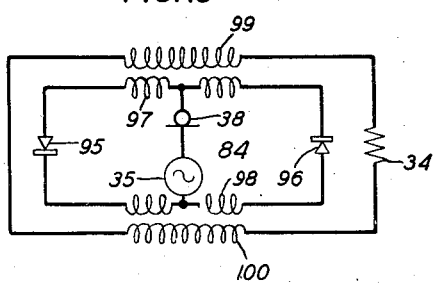

Fig. 15 shows a bridge network 84 embodying rectifiers 95 and 96 connected alternately in series with split transformer windings 97 and 98 across whose mid-points are applied in series carrier generator 35 and signaling source 38. The rectifiers 95 and 96 are poled in the same conductive direction in the network 84, and are balanced with the windings 97 and 98 to a relatively high degree of precision in both conductive and non-conductive directions. Transformer windings 99 and 100 in series couple the network 84 to the load circuit 34. Fig. 15 operates in the well-known manner to produce signal modulated carrier waves. The transformer windings 97 and 99 and 98 and 100 prevent effective direct transmission between the network 84 and the load circuit 34.

Figure 16:
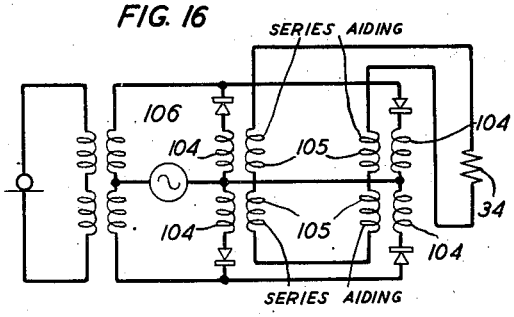

Fig. 16 is similar to Figs. 1 and 7 except an inductance 104 is disposed in series with each rectifier of each pair of parallel rectifiers. Inductances 105 individual to each network inductance 104 are arranged in a series-aiding relationship to couple the load 34 to network 106. Thus, the inductances 104 and 105 of each network arm prevent effective direct transmission between the network 106 and the load circuit 34.

Although a biasing battery is not shown in any of the above embodiments of the invention, it is to be understood that suitable biasing arrangements may be included therein, when desired, in the manner disclosed in the patents of F. A. Cowan and R. O. Wise, 1,959,459 and 2,233,860, granted May 22, 1934, and March 4, 1941, respectively. For simplicity, all filters are omitted, but it is to be also understood that they may be used whenever required.

What is claimed is:

1. A frequency translating system comprising a bridge network comprising an inductance in at least two arms and rectifying means in at least two other arms, said rectifying means comprising a pair of rectifiers disposed in each of said two other arms, each rectifier pair comprising two rectifiers arranged in parallel and in opposite conductive directions, said inductances and rectifiers being arranged in a balanced relation, a pair of circuits for supplying alternating current waves to said network to be translated, a load circuit for utilizing the translated waves, and circuit means to connect effectively said supplying circuits and said load circuit to diagonals of said network, said circuit connecting means including a pair of further inductances coupled to said network inductances to prevent effectively direct transmission between said network and at least one of said supplying circuits.

2. A frequency translating system comprising a bridge network comprising a split transformer winding having one winding connected in each of two adjacent arms, rectifying means connected in each of two other adjacent arms, said rectifying means comprising a pair of non-linear rectifiers in each of said two adjacent arms, each rectifier pair comprising two rectifiers connected in parallel and oppositely disposed such that the conducting interval of one rectifier is substantially coincident with the non-conducting interval of the other, said split winding and said rectifying means being arranged in a balanced relation, a pair of circuits for supplying alternating current waves to said network to be translated, a load circuit for utilizing the translated waves, and circuit means for effectively connecting said supplying circuits and said load circuit to diagonals of said network, said circuit connecting means including one split transformer winding coupled to said network transformer winding and effective to prevent direct transmission between said network and at least one of said supplying circuits.

3. A modulating system comprising a non-linear bridge network comprising a split transformer winding having one winding in each of two adjacent arms and non-linear rectifying means in each of two other adjacent arms, said rectifying means comprising a pair of non—linear rectifiers in each of said two other adjacent arms, each of said rectifier pair comprising two rectifiers connected in parallel and in opposite conductive directions, said network winding and said rectifying means being arranged in a balanced relation, a source of signaling waves, a generator of carrier waves, a load circuit, and circuit means for effectively connecting said signaling source, said carrier generator and said load circuit to diagonals of said network, said connecting means including a further split transformer winding applied to said signaling source and coupled to said network winding to prevent direct transmission between said network and said signaling source.

4. A modulating system comprising a non-linear bridge network comprising a split transformer winding having one winding in each of two adjacent arms and non-linear rectifying means in each of two other adjacent arms, said rectifying means comprising a pair of non-linear rectifiers in each of said two other adjacent arms, each rectifier pair comprising two rectifiers connected in parallel and oppositely disposed such that the conducting interval of one rectifier is substantially coincident with the non-conducting interval of the other, said network winding and said rectifying means being arranged in a balanced relation, a source of signaling waves, a generator of carrier waves, a load circuit, and circuit means for effectively connecting said signaling source, said carrier generator and said load circuit to the diagonals of said network, said connecting means including a further split transformer winding applied to said carrier generator and coupled to said network winding to prevent direct transmission between said network and said carrier generator.

RAYMOND O. WISE.